United States Patent
Tomita (10) Patent No.: US 10,632,798 B2
(45) Date of Patent: Apr. 28, 2020

(54) PNEUMATIC TIRE

(71) Applicant: SUMITOMO RUBBER INDUSTRIES, LTD., Kobe-shi, Hyoto (JP)

(72) Inventor: Shintaro Tomita, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 400 days.

(21) Appl. No.: 15/792,877

(22) Filed: Oct. 25, 2017

(65) Prior Publication Data

US 2018/0111425 A1   Apr. 26, 2018

(30) Foreign Application Priority Data

Oct. 26, 2016   (JP) .................................. 2016-209518

(51) Int. Cl.

| B60C 15/024 | (2006.01) |
|---|---|
| B60C 13/02 | (2006.01) |
| B60C 3/04 | (2006.01) |
| B60C 15/06 | (2006.01) |
| B60C 15/00 | (2006.01) |
| B60C 13/00 | (2006.01) |

(52) U.S. Cl.
CPC ............ *B60C 15/0242* (2013.01); *B60C 3/04* (2013.01); *B60C 13/02* (2013.01); *B60C 15/0027* (2013.01); *B60C 13/003* (2013.01); *B60C 2015/061* (2013.01); *B60C 2015/0617* (2013.01)

(58) Field of Classification Search
CPC ... B60C 15/024; B60C 15/0242; B60C 13/02; B60C 13/003; B60C 3/04; B60C 2015/061; B60C 2015/0617
See application file for complete search history.

(56) References Cited

U.S. PATENT DOCUMENTS

| 2015/0075694 A1 | 3/2015 | Nagai |
|---|---|---|
| 2015/0217604 A1 | 8/2015 | Nagai |
| 2017/0225522 A1* | 8/2017 | Tomita ................ B60C 15/0242 |

FOREIGN PATENT DOCUMENTS

| JP | 04212605 A | * | 8/1992 |
|---|---|---|---|
| JP | 04215508 A | * | 8/1992 |
| JP | 2015120459 A | * | 7/2015 |
| JP | 2015182625 A | * | 10/2015 |

\* cited by examiner

*Primary Examiner* — Adrienne C. Johnstone
(74) *Attorney, Agent, or Firm* — Birch, Stewart, Kolasch & Birch, LLP (57) ABSTRACT

Each side piece 40 of a tire 2 includes a rim protector 42. A bob profile representing a contour of the rim protector 42 includes a first circular arc extending outward from a top PT of the rim protector 42, and a second circular arc extending inward from the top PT. A center of the first circular arc is located inward of the bob profile, and a center of the second circular arc is located outward of the bob profile. The side piece 40 includes a side apex 22, and the side apex 22 intersects a normal line LT that is normal to a carcass 12 and passes through the top PT.

4 Claims, 2 Drawing Sheets

PNEUMATIC TIRE

This application claims priority on Patent Application No. 2016-209518 filed in JAPAN on Oct. 26, 2016. The entire contents of this Japanese Patent Application are hereby incorporated by reference.

BACKGROUND OF THE INVENTION

Field of the Invention

The present invention relates to pneumatic tires. Specifically, the present invention relates to pneumatic tires including rim protectors at side surfaces thereof.

Description of the Related Art

On a road having a sidewalk, a curb is provided between the roadway and the sidewalk. When a vehicle is moved close to a road shoulder, the sidewall of a tire may come into contact with the curb. Due to this contact, the sidewall may be damaged.

A tire is mounted onto a rim. The rim includes a flange. When a vehicle is moved close to a road shoulder, the flange may come into contact with a curb. Due to this contact, the flange may be damaged.

A rim protector may be provided at each side surface of a tire. The rim protector extends in the circumferential direction of the tire. The rim protector projects outward in the axial direction of the tire. With a tire including rim protectors, when a vehicle is moved close to a road shoulder, a sidewall or a flange does not come into contact with a curb, but the rim protector comes into contact with the curb. This contact contributes to prevention of damage of the sidewall or the flange. Examples of such rim protectors are disclosed in JP2013-220786 (US2015/0075694) and JP2014-083994 (US2015/0217604).

There is a trend in which consideration is given to the environment by reducing influence of tires on the gas mileages of vehicles. Since the labeling system has been introduced, there are many users who place importance on rolling resistance when selecting tires. In these days, it has been taken for granted that tires have low rolling resistance. In light of low rolling resistance, tires having low weights are desired.

For example, the weight of a tire can be reduced by reducing the volumes of components such as sidewalls. However, the reduction in the volumes influences the stiffness of the tire.

A rim protector needs to have a size (or shape) to some extent in order to perform a function thereof. The rim protector contributes to the stiffness of a tire. The rim protector influences the weight of the tire.

A rim applicable to a tire is specified in a standard on which the tire is based. In the standard, application of a plurality of rims having different sizes to one tire is allowed. Thus, when a rim having a largest size is selected from among a plurality of applicable rims, the rim protector may not be able to contribute to prevention of damage of a flange, depending on the size (or shape) of the rim protector. On the other hand, when a rim having a smallest size is selected from among the plurality of applicable rims, the rim protector may interfere with a flange to make it impossible to appropriately mount the tire onto the rim. In order for the rim protector to perform its function for all the applicable rims, it is necessary to appropriately adjust the size (or shape) of the rim protector.

An object of the present invention is to provide a pneumatic tire that has a rim protector capable of sufficiently performing its function and that has enhanced stiffness while an increase in the weight of the tire is suppressed.

SUMMARY OF THE INVENTION

A pneumatic tire according to the present invention includes a tread, a pair of side pieces, a pair of beads, and a carcass. Each side piece extends from an edge of the tread substantially inward in a radial direction. Each bead is located inward of the side piece in an axial direction at a radially inner portion of the side piece. The carcass extends along inner sides of the tread and the side pieces and on and between one of the beads and the other of the beads.

In the tire, the side piece includes a main body and a rim protector projecting outward from the main body and extending in a circumferential direction. A reference profile representing a contour of the main body is represented by a plurality of circular arcs aligned in the radial direction. The circular arcs include an outer circular arc extending substantially outward in the radial direction from a reference position corresponding to a position at which the tire has a maximum width in the axial direction, and an inner circular arc extending substantially inward in the radial direction from the reference position. The outer circular arc and the inner circular arc are tangent to each other at the reference position.

In the tire, a bob profile representing a contour of the rim protector includes two circular arcs aligned in the radial direction. A point of intersection between the circular arcs is a "top" of the rim protector, and, of the circular arcs, one circular arc extending substantially outward in the radial direction from the top is a first circular arc, and the other circular arc extending substantially inward in the radial direction from the top is a second circular arc.

In the tire, the first circular arc is tangent to the outer circular arc at a radially outer end thereof. A center of the first circular arc is located inward of the bob profile. The second circular arc is tangent to the inner circular arc at a radially inner end thereof. A center of the second circular arc is located outward of the bob profile. A ratio of a distance in the radial direction from a bead base line of the tire to the top relative to a distance in the radial direction from the bead base line to a radially outer end of the carcass is not less than 0.29 and not greater than 0.41.

In the tire, the side piece includes a side apex. The side apex extends outward in the radial direction along the carcass at a radially outer side of the bead. The side apex intersects a normal line that is normal to the carcass and passes through the top. A ratio of a thickness of the side apex measured along the normal line, relative to a thickness of the side piece measured along the normal line, is not less than 0.10 and not greater than 0.29. In the radial direction, a position of an outer end of the side apex coincides with a position of an axially outer end of the carcass, or the outer end of the side apex is located inward of the axially outer end of the carcass.

In the pneumatic tire according to the present invention, the contour of the rim protector, which projects outward from the main body of the side piece, is represented by the bob profile, which includes the first circular arc and the second circular arc. According to the rim protector, the gauge from the position, at which the tire has the maximum width, to a bead portion is effectively ensured while the influence of the rim protector on a weight is suppressed. The rim protector contributes to enhancement of the lateral stiffness of the tire.

Furthermore, in the tire, the top of the rim protector is located at an appropriate position. Thus, even when the tire is mounted onto any of applicable rims, the rim protector sufficiently serves to prevent damage of a sidewall or a flange.

In the tire, the side apex is provided radially outward of each bead so as to extend outward in the radial direction along the carcass. The side apex intersects the normal line, which is normal to the carcass and passes through the top of the rim protector, and has an appropriate thickness at the position of the normal line. The side apex contributes to enhancement of in-plane torsional stiffness while suppressing the influence thereof on the weight.

According to the present invention, the pneumatic tire that has the rim protector capable of sufficiently performing its function and has enhanced stiffness while an increase in the weight of the tire is suppressed, is obtained.

Preferably, in the pneumatic tire, the outer end of the side apex is located inward of the axially outer end of the carcass in the radial direction.

Preferably, in the pneumatic tire, a ratio of a radius of the second circular arc relative to a radius of the first circular arc is not less than 0.056 and not greater than 0.117.

DESCRIPTION OF THE PREFERRED EMBODIMENTS

The following will describe in detail the present invention based on preferred embodiments with appropriate reference to the drawings.

Figure 1:
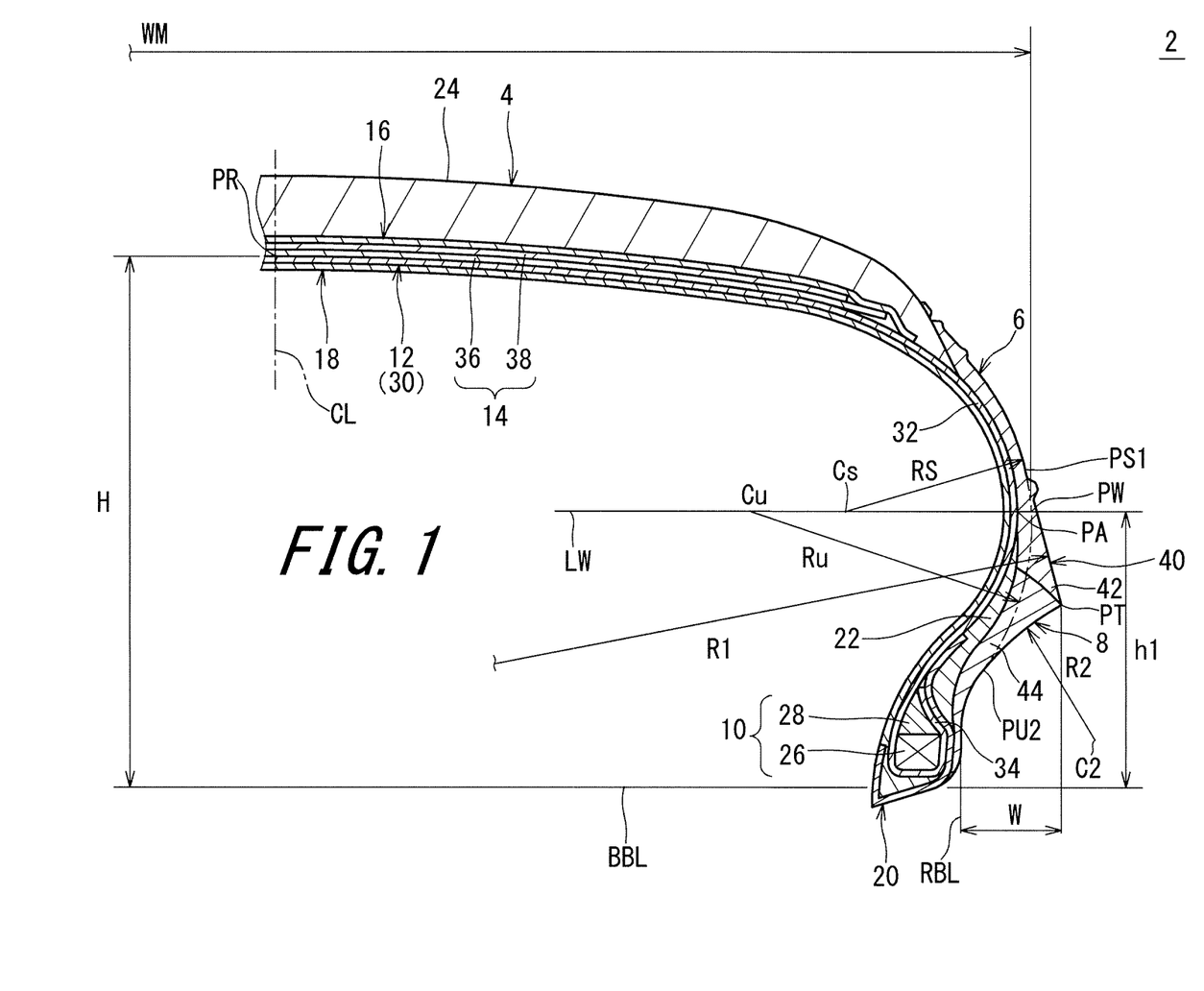
FIG. 1 is a cross-sectional view of a portion of a pneumatic tire according to an embodiment of the present invention.

FIG. 1 shows a cross-section of a pneumatic tire 2. In FIG. 1, the up-down direction is the radial direction of the tire 2, the right-left direction is the axial direction of the tire 2, and the direction perpendicular to the surface of the sheet is the circumferential direction of the tire 2. The cross-section shown in FIG. 1 is obtained by cutting the tire 2 along a plane perpendicular to the circumferential direction. The cross-section extends along a plane including a rotation axis of the tire 2.

In FIG. 1, an alternate long and short dash line CL represents the equator plane of the tire 2. The shape of the tire 2 is symmetrical about the equator plane except for a tread pattern. A solid line BBL is a bead base line. The bead base line is a line that defines the rim diameter (see the JATAM) of a rim. The bead base line extends in the axial direction.

The tire 2 includes a tread 4, a pair of sidewalls 6, a pair of clinches 8, a pair of beads 10, a carcass 12, a belt 14, a band 16, an inner liner 18, a pair of chafers 20, and a pair of side apexes 22. The tire 2 is of a tubeless type. The tire 2 is mounted to a passenger car.

The tread 4 has a shape that is convex outward in the radial direction. The tread 4 forms a tread surface 24 that is brought into contact with a road surface. The tread 4 is formed from a crosslinked rubber. Particularly, a crosslinked rubber for which wear resistance, heat resistance, and grip performance are taken into consideration is used for a portion of the tread 4 that includes the tread surface 24. Although not shown, grooves can be formed on the tread 4. Accordingly, the tread pattern is formed.

Each sidewall 6 extends from the tread 4 substantially inward in the radial direction. A radially outer portion of the sidewall 6 is joined to the tread 4. A radially inner portion of the sidewall 6 is joined to the clinch 8. The sidewall 6 is formed from a crosslinked rubber that has excellent cut resistance and weather resistance. The sidewall 6 prevents the carcass 12 from being damaged.

Each clinch 8 is located inward of the sidewall 6 in the radial direction. The clinch 8 is located outward of the bead 10 and the carcass 12 in the axial direction. The clinch 8 is formed from a crosslinked rubber that has excellent wear resistance. The clinch 8 comes into contact with a flange of a rim.

Each bead 10 is located inward of the clinch 8 in the axial direction. The bead 10 includes a core 26 and a main apex 28 extending from the core 26 outward in the radial direction. The core 26 has a ring shape and includes a non-stretchable wound wire. A typical material of the wire is steel. The main apex 28 is tapered outward in the radial direction.

In the tire 2, a crosslinked rubber having a complex elastic modulus E* (hereinafter, sometimes referred to merely as elastic modulus EMA) that is set in a range of not less than 50 MPa and not greater than 80 MPa is used for the main apex 28. The main apex 28 is formed from a crosslinked rubber having high stiffness.

In the present invention, a complex elastic modulus E* of each component forming the tire 2 is measured according to the standards of "JIS K 6394". In the measurement, a plate-shaped test piece (length=45 mm, width=4 mm, thickness=2 mm) is used. The test piece may be cut out from the tire 2, or may be cut out from a sheet that is produced from a rubber composition for a member to be measured for the complex elastic modulus E*. The measurement conditions are as follow.

Viscoelasticity spectrometer: "VESF-3" manufactured by Iwamoto Seisakusho
Initial strain: 10%
Dynamic strain: ±1%
Frequency: 10 Hz
Deformation mode: tension
Measurement temperature: 70° C.

The carcass 12 includes a carcass ply 30. The carcass ply 30 extends along the tread 4, each sidewall 6, and each clinch 8. The carcass ply 30 extends on and between the beads 10 at both sides. The carcass ply 30 is turned up around each core 26 from the inner side toward the outer side in the axial direction. Because of this turning-up, a main portion 32 and turned-up portions 34 are formed in the carcass ply 30. The carcass ply 30 includes the main portion 32 and a pair of the turned-up portions 34. The main portion 32 extends on and between one of the cores 26 and the other of the cores 26. Each turned-up portion 34 extends outward in the radial direction from the core 26 along the bead 10.

In the tire 2, the carcass 12 is formed of the one carcass ply 30. The carcass 12 may be formed of two or more carcass plies 30.

The carcass ply 30 includes a large number of cords aligned with each other, and a topping rubber, which are not shown. The absolute value of the angle of each cord relative to the equator plane is 75° to 90°. In other words, the carcass 12 has a radial structure. The cords are formed from an organic fiber. Examples of preferable organic fibers include polyester fibers, nylon fibers, rayon fibers, polyethylene naphthalate fibers, and aramid fibers.

In FIG. 1, reference character PR indicates the radially outer end of the carcass 12. At the outer end PR, the carcass 12 has a maximum height in the radial direction. Reference character PA indicates the axially outer end of the carcass 12. At the outer end PA, the carcass 12 has a maximum width in the axial direction.

In FIG. 1, a double-headed arrow H represents the distance in the radial direction from the bead base line to the outer end PR. The distance H is the height, in the radial direction, of the carcass 12. A double-headed arrow h1 represents the distance in the radial direction from the bead base line to the outer end PA. The distance h1 is the height of the position at which the carcass 12 has the maximum width.

In the tire 2, the ratio of the distance h1 relative to the distance H is not less than 0.49 and not greater than 0.56. In other words, the contour of the carcass 12 is formed such that the ratio of the distance h1 relative to the distance H falls within a range of not less than 0.49 and not greater than 0.56. In a conventional tire, this ratio is set to approximately 0.6. Thus, the position PA at which the carcass 12 has the maximum width is closer to the bead 10 than that in the conventional tire.

Normally, in a tire, a radially inner portion from the position at which the width is at its maximum is tilted relative to the radial direction. As described above, in the tire 2, the position PA at which the carcass 12 has the maximum width is closer to the bead 10 than that in the conventional tire. Thus, in the tire 2, the tilt of the inner portion from the position PA is larger than that in the conventional tire. In a range where the tire 2 can support a vehicle weight, the large tilt contributes to enhancement of lateral stiffness, and thus the carcass 12 of the tire 2 contributes to enhancement of lateral stiffness more than that of the conventional tire. In other words, in the tire 2, the carcass 12 for which contribution to lateral stiffness is taken into consideration is used. When the ratio of the distance h1 relative to the distance H is less than 0.49, unnatural sharp bending may occur in the contour of the carcass 12 between the outer end PA and the bead 10, so that the carcass 12 having an appropriate contour is not obtained. When this ratio is greater than 0.56, the above-described tilt becomes small, and sharp bending may occur near the boundary between the tread 4 and the sidewall 6, that is, near a buttress, so that the carcass 12 having an appropriate contour is not obtained.

The belt 14 is located inward of the tread 4 in the radial direction. The belt 14 is laminated on the carcass 12. The belt 14 reinforces the carcass 12. The belt 14 includes an inner layer 36 and an outer layer 38. As is obvious from FIG. 1, the width of the inner layer 36 is slightly larger than the width of the outer layer 38 in the axial direction.

Each of the inner layer 36 and the outer layer 38 includes a large number of cords aligned with each other, and a topping rubber, which are not shown. Each cord is tilted relative to the equator plane. The absolute value of the tilt angle is generally not less than 10° and not greater than 35°. The direction in which each cord of the inner layer 36 is tilted relative to the equator plane is opposite to the direction in which each cord of the outer layer 38 is tilted relative to the equator plane. The material of the cords is preferably steel. An organic fiber may be used for the cords. In this case, examples of preferable organic fibers include nylon fibers, polyester fibers, rayon fibers, polyethylene naphthalate fibers, and aramid fibers. The width, in the axial direction, of the belt 14 is preferably equal to or greater than 0.7 times of the maximum width of the tire 2. The belt 14 may include three or more layers.

The band 16 is located outward of the belt 14 in the radial direction. The width of the band 16 is larger than the width of the belt 14 in the axial direction. The band 16 covers the entirety of the belt 14.

The band 16 includes a cord and a topping rubber, which are not shown. The cord is helically wound. The band 16 has a so-called jointless structure. The cord extends substantially in the circumferential direction. The angle of the cord relative to the circumferential direction is not greater than 5° and further not greater than 2°. The belt 14 is held by the cord, so that lifting of the belt 14 is suppressed. The cord is formed from an organic fiber. Examples of preferable organic fibers include nylon fibers, polyester fibers, rayon fibers, polyethylene naphthalate fibers, and aramid fibers.

The inner liner 18 is located inward of the carcass 12. The inner liner 18 is joined to the inner surface of the carcass 12. The inner liner 18 is formed from a crosslinked rubber that has an excellent air blocking property. A typical base rubber of the inner liner 18 is an isobutylene-isoprene-rubber or a halogenated isobutylene-isoprene-rubber. The inner liner 18 maintains the internal pressure of the tire 2.

Each chafer 20 is located in the vicinity of the bead 10. When the tire 2 is mounted onto the rim, the chafer 20 comes into contact with the rim. Because of this contact, the vicinity of the bead 10 is protected. In this embodiment, the chafer 20 includes a fabric and a rubber with which the fabric is impregnated. The chafer 20 may be integrated with the clinch 8. In this case, the material of the chafer 20 is the same as the material of the clinch 8.

Each side apex 22 is located outward of the bead 10 in the radial direction. The side apex 22 is located outward of the carcass 12 in the axial direction. The side apex 22 is located inward of the clinch 8 in the axial direction. As shown in FIG. 1, the side apex 22 extends outward in the radial direction along the carcass 12 at the outer side of the bead 10. In the tire 2, the turned-up portion 34 of the carcass ply 30 is located between the side apex 22 and the main apex 28.

In the tire 2, a crosslinked rubber having stiffness substantially equal to that of the main apex 28 is used for the side apex 22. Specifically, a crosslinked rubber having a complex elastic modulus E* that is adjusted so as to be not less than 0.9 and not greater than 1.1 of the elastic modulus EMA of the main apex 28, is used for the side apex 22. In other words, the ratio of the complex elastic modulus E* (hereinafter, sometimes referred to merely as elastic modulus ESA) of the side apex 22 relative to the elastic modulus EMA of the main apex 28 is not less than 0.9 and not greater than 1.1. The side apex 22 is formed from a crosslinked rubber having high stiffness, similarly to the main apex 28.

In the present invention, a portion of the tire 2 at the axially outer side of the carcass 12 and from each sidewall 6 to each clinch 8, that is, a portion including each sidewall 6, each clinch 8, and each side apex 22, is referred to as side piece 40. That is, the tire 2 includes a pair of side pieces 40. Each side piece 40 extends from the edge of the tread 4 substantially inward in the radial direction. The bead 10 is located inward of the side piece 40 in the axial direction at a radially inner portion of the side piece 40. The carcass 12 extends on and between one of the beads 10 and the other of the beads 10 along the inner side of the tread 4 and each side piece 40. In the tire 2, each side piece 40 includes the sidewall 6, the clinch 8, and the side apex 22.

The aspect ratio (see JATMA) of the tire 2 is not greater than 50%. Specifically, the aspect ratio of the tire 2 is 45%. The tire 2 is of a low-flattening type.

As in the tire 2, in a tire having an aspect ratio of not greater than 50%, a rim protector 42 is normally provided at each side piece 40 of the tire. The side piece 40 includes the rim protector 42. Specifically, the side piece 40 includes a main body 44 and the rim protector 42. The rim protector 42 is located outward of the main body 44 in the axial direction. The rim protector 42 projects from the main body 44 outward in the axial direction. The rim protector 42 extends in the circumferential direction. The rim protector 42 has a ring shape.

In the present invention, a line that forms the outer shape of the main body 44 is referred to as reference profile. In other words, the reference profile represents the contour of the main body 44. In the present invention, a line that forms the outer shape of the rim protector 42 is referred to as bob profile. In other words, the bob profile represents the contour of the rim protector 42.

In FIG. 1, reference character PT indicates a top of the rim protector 42. The top PT is represented by a position at which a height from the reference profile is at its maximum. The height from the reference profile is obtained by measuring the length from the reference profile to the bob profile along a line normal to the reference profile in the cross-section shown in FIG. 1.

As described above, each side piece 40 of the tire 2 includes the sidewall 6 and the clinch 8. In the tire 2, the boundary between the sidewall 6 and the clinch 8 intersects the bob profile of the rim protector 42 at the top PT. The boundary may intersect the bob profile at a radially outer portion from the top PT. The boundary may intersect the bob profile at a radially inner portion from the top PT.

In the present invention, the contours of the tire 2 and the components forming the tire 2 are specified on the basis of dimensions measured in a state where the tire 2 is mounted on a normal rim and inflated with air to a normal internal pressure, unless otherwise specified. During the measurement of the dimensions for specifying the contours, no load is applied to the tire 2. In the case where grooves are formed on the tread 4, the contour of the tread surface 24 is specified by a virtual outer surface obtained by assuming that the grooves are not present. In the case where a recessed and projecting pattern is provided on the side piece 40, the contour of the side piece 40 is specified by a virtual outer surface obtained assuming that the recessed and projecting pattern is not present. The contour of the main body 44 described above is specified by a virtual outer surface obtained by assuming that the rim protector 42 is not present in the side piece 40.

In the present invention, similarly to the measurement of the dimensions for specifying the above-described contours, the dimensions and angles of each component of the tire 2 are also measured in a state where the tire 2 is mounted on a normal rim and inflated with air to a normal internal pressure, unless otherwise specified. During the measurement, no load is applied to the tire 2. In the case where the tire 2 is designed for a passenger car, the dimensions and angles are measured in a state where the internal pressure is 180 kPa, unless otherwise specified.

In the present specification, the normal rim means a rim specified in a standard on which the tire 2 is based. The "Standard Rim" in the JATMA standard, the "Design Rim" in the TRA standard, and the "Measuring Rim" in the ETRTO standard are normal rims.

In the present specification, the normal internal pressure means an internal pressure specified in the standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

In the present specification, a normal load means a load specified in the standard on which the tire 2 is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRO standard are normal loads.

In FIG. 1, reference character PW represents a specific position on the reference profile, which represents the contour of the main body 44. In the tire 2, at the position PW, the reference profile has a maximum width in the axial direction. In FIG. 1, a double-headed arrow MW represents the distance in the axial direction from one position PW to the other position PW (not shown). In the present invention, the distance WM in the axial direction at the position PW is the maximum width (also referred to as cross-sectional width) of the tire 2. In other words, the position PW corresponds to a position at which the tire 2 has the maximum width WM in the axial direction. In the present invention, the position PW is referred to as reference position. In FIG. 1, a solid line LW is a straight line that passes through the reference position PW and extends in the axial direction.

In the tire 2, in the radial direction, the reference position PW coincides with the position of the above-described outer end PA of the carcass 12. The reference position PW relative to the outer end PA is not particularly limited. However, in light of appropriate bending, the reference position PW is preferably close to the outer end PA. Specifically, the ratio of the distance (not shown) in the radial direction from the bead base line to the reference position PW, relative to the distance h1 in the radial direction to the outer end PA, is preferably not less than 0.95 and preferably not greater than 1.05.

In the tire 2, the reference profile, which represents the contour of the main body 44, is represented by a plurality of circular arcs aligned in the radial direction. In other words, the reference profile includes the plurality of circular arcs aligned in the radial direction. These circular arcs include a circular arc (hereinafter, referred to as outer circular arc) extending from the reference position PW substantially outward in the radial direction, and a circular arc (hereinafter, referred to as inner circular arc) extending from the reference position PW substantially inward in the radial direction.

In FIG. 1, an arrow Rs represents the radius (radius of curvature) of the outer circular arc. An arrow Ru represents the radius (radius of curvature) of the inner circular arc. Reference character Cs indicates the center of the outer circular arc, and reference character Cu indicates the center of the inner circular arc. As shown in FIG. 1, the center Cs of the outer circular arc and the center Cu of the inner circular arc are located on the straight line LW. In the tire 2, the outer circular arc and the inner circular arc are tangent to each other at the reference position PW. The reference position PW is the tangent point between the outer circular arc and the inner circular arc.

In the tire 2, the reference profile includes the outer circular arc and the inner circular arc, and the outer circular arc and the inner circular arc are tangent to each other at the reference position PW. Each of the outer circular arc and the inner circular arc has a shape that is convex outward. The reference profile has a shape that is convex outward in the axial direction. As described above, the reference position PW corresponds to the position at which the tire 2 has the maximum width WM. The main body 44 of the side piece 40 having this reference profile contributes to bending.

In the tire 2, in light of appropriate bending and support of a vehicle weight, the radius Rs of the outer circular arc is preferably not less than 30 mm and not greater than 60 mm. The radius Ru of the inner circular arc is preferably not less than 40 mm and not greater than 70 mm. In the tire 2, the radius Ru of the inner circular arc is preferably larger than the radius Rs of the outer circular arc. Specifically, the ratio of the radius Ru of the inner circular arc relative to the radius Rs of the outer circular arc is preferably not less than 1.2 and not greater than 1.7.

In the tire 2, the bob profile, which represents the contour of the rim protector 42, is represented by two circular arcs aligned in the radial direction. Of these circular arcs, one circular arc extends from the top PT of the rim protector 42 substantially outward in the radial direction. The other circular arc extends from the top PT of the rim protector 42 substantially inward in the radial direction. In the present invention, the bob profile includes the two circular arcs aligned in the radial direction. In the tire 2, the point of intersection between these circular arcs is the top PT of the rim protector 42, the one circular arc extending from the top PT substantially outward in the radial direction is a first circular arc, and the other circular arc extending from the top PT substantially inward in the radial direction is a second circular arc. In the case where a portion of the rim protector 42 corresponding to the top PT is rounded or the like so that the top PT cannot be specified, the first circular arc and the second circular arc are specified on the bob profile, then the point of intersection between the first circular arc and the second circular arc is obtained, and this point of intersection is specified as the top PT.

In FIG. 1, an arrow R1 represents the radius (radius of curvature) of the first circular arc. The center of the first circular arc is located inward of the bob profile, although not shown since the radius of the first circular arc is large. A position PS1 is the radially outer end of the first circular arc. The position PS1 is the radially outer end of the bob profile, namely, of the rim protector 42. In the tire 2, the first circular arc is tangent to the outer circular arc at the position PS1, that is, the outer end PS1. The position PS1 is the tangent point between the first circular arc and the outer circular arc. The position PS1, the center Cs of the outer circular arc, and the center (not shown) of the first circular arc are located on the same straight line.

In FIG. 1, an arrow R2 represents the radius (radius of curvature) of the second circular arc. Reference character C2 indicates the center of the second circular arc. The center C2 of the second circular arc is located outward of the bob profile. A position PU2 is the radially inner end of the second circular arc. The position PU2 is the radially inner end of the bob profile, namely, of the rim protector 42. In the tire 2, the second circular arc is tangent to the inner circular arc at the position PU2, that is, the inner end PU2. The position PU2 is the tangent point between the second circular arc and the inner circular arc. The position PU2, the center Cu of the inner circular arc, and the center C2 of the second circular arc are located on the same straight line.

In the tire 2, of the two circular arcs that represent the contour of the rim protector 42, the first circular arc is an outwardly convex circular arc, and the second circular arc is an inwardly convex circular arc. In the tire 2, at the radially outer portion from the top PT, the thickness of the rim protector 42 gradually increases from the outer end PS1 toward the top PT. Particularly, at this portion, the rim protector 42 is formed such that the rate of change in the thickness thereof decreases as the distance to the top PT decreases. At the radially inner portion from the top PT, the thickness of the rim protector 42 gradually increases from the inner end PU2 toward the top PT. Particularly, at this portion, the rim protector 42 is formed such that the rate of change in the thickness thereof increases as the distance to the top PT decreases.

In the tire 2, the rim protector 42 has a shape spreading from the top PT toward the main body 44. As described above, the rim protector 42 is formed such that: at the radially outer portion from the top PT, the rate of change in the thickness decreases as the distance to the top PT decreases; and, at the radially inner portion from the top PT, the rate of change in the thickness increases as the distance to the top PT decreases. In the rim protector 42, a portion having a thickness larger than necessary is less likely to be formed. In the tire 2, the influence of the rim protector 42 on the weight of the tire 2 is reduced to be small. The influence of the rim protector 42 on the stiffness of the tire 2 is also not specific. The rim protector 42 effectively enhances the lateral stiffness of the tire 2 while suppressing an increase in the weight of the tire 2.

Figure 2:
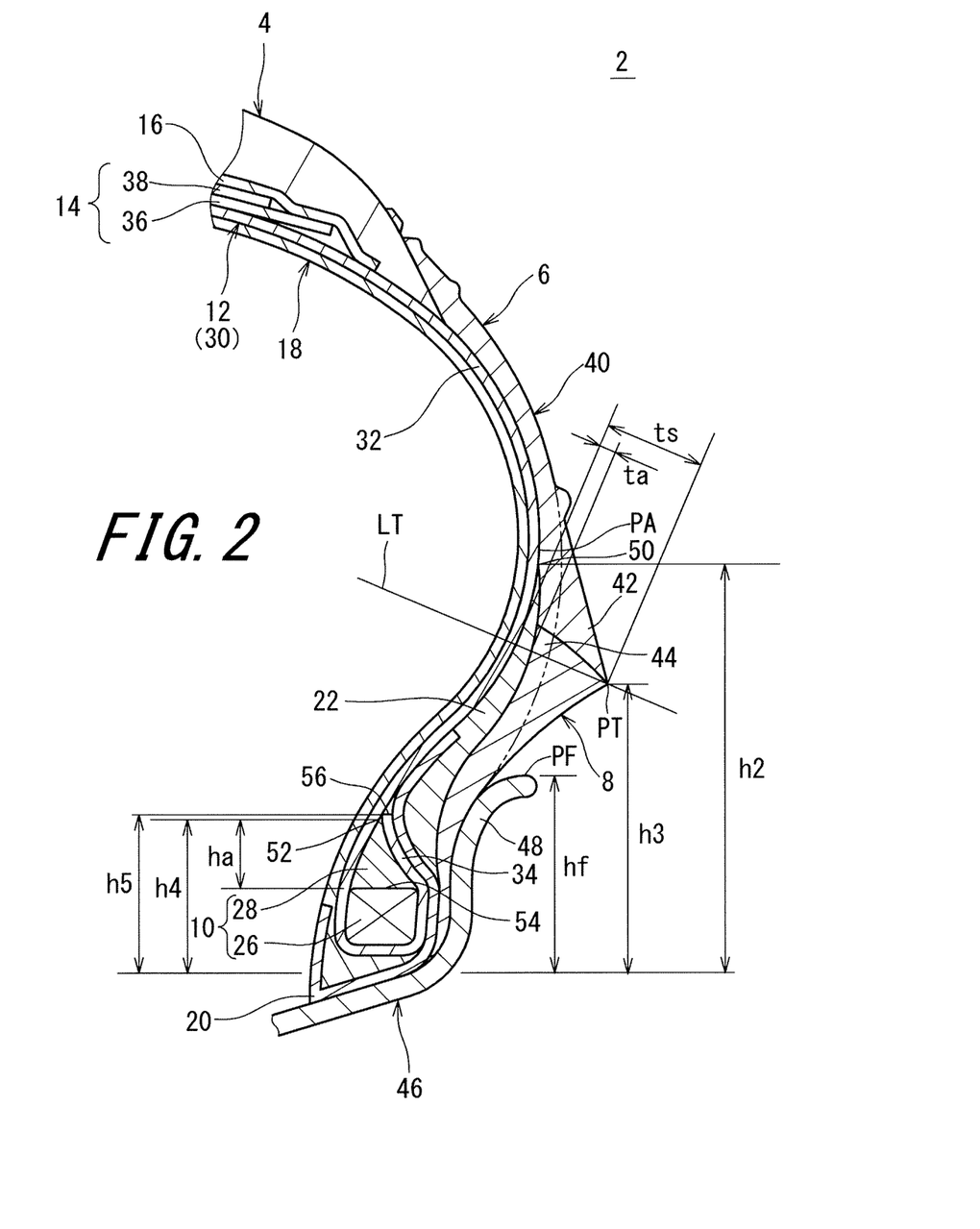
FIG. 2 is an enlarged cross-sectional view of a portion of the tire in FIG. 1.

FIG. 2 shows a rim protector 42 portion of the tire 2 shown in FIG. 1, together with a rim 46. The rim 46 is a normal rim. In FIG. 2, the up-down direction is the radial direction of the tire 2, the right-left direction is the axial direction of the tire 2, and the direction perpendicular to the surface of the sheet is the circumferential direction of the tire 2.

In FIG. 2, a double-headed arrow h3 represents the distance in the radial direction from the bead base line to the top PT of the rim protector 42. The distance h3 is the height, in the radial direction, of the top PT of the rim protector 42.

In the tire 2, the ratio of the distance h3 relative to the distance H represented in FIG. 1 is not less than 0.29. By this ratio being set to be not less than 0.29, the rim protector 42 is effectively prevented from interfering with a flange 48 of the rim 46. The tire 2 is appropriately mounted onto the rim 46. The volume of the rim protector 42 is appropriately maintained. Thus, in the tire 2, the influence of the rim protector 42 on the weight thereof is suppressed.

In the tire 2, the ratio of the distance h3 relative to the distance H is not greater than 0.41. By this ratio being set to be not greater than 0.41, the rim protector 42 effectively serves to prevent damage of the flange 48 or the sidewall 6. A top PT portion of the rim protector 42 effectively contributes to the stiffness of a bead 10 portion. Thus, in the tire 2, the lateral stiffness thereof can be enhanced. Furthermore, movement of the bead 10 portion is effectively suppressed. Thus, in the tire 2, an increase in the rolling resistance thereof is also suppressed.

In the tire 2, the rim protector 42 effectively prevents damage of the sidewall 6 or the flange 48 even when the tire 2 is mounted onto a rim 46 having a largest size among a plurality of applicable rims 46 specified in the standard on which the tire 2 is based. In addition, even when the tire 2 is mounted onto a rim 46 having a smallest size among the plurality of applicable rims 46, interference of the rim protector 42 with the flange 48 is effectively prevented, so that the tire 2 can be appropriately mounted onto the rim 46. Even when the tire 2 is mounted onto any applicable rim 46, the rim protector 42 sufficiently serves to prevent damage of the sidewall 6 or the flange 48.

In FIG. 2, a solid line LT is a normal line that is normal to the carcass 12 and passes through the top PT of the rim protector 42. As shown in FIG. 2, in the tire 2, the side apex 22 intersects the normal line LT. The side apex 22 sufficiently overlaps the rim protector 42 portion in the axial direction. This overlap synergistically contributes to enhancement of in-plane torsional stiffness, in cooperation with the contour of the rim protector 42 being formed by the bob profile including the first circular arc and the second circular arc described above. In the tire 2, high in-plane torsional stiffness is obtained.

In FIG. 2, a double-headed arrow ts represents the thickness of the side piece 40. The thickness ts is measured along the normal line LT. A double-headed arrow ta represents the thickness of the side apex 22. The thickness ta is also measured along the normal line LT similarly to the above thickness ts.

In the tire 2, the ratio of the thickness ta relative to the thickness ts is not less than 0.10 and not greater than 0.29. By this ratio being set to be not less than 0.10, the side apex 22 contributes to enhancement of the in-plane torsional stiffness of the tire 2. From this standpoint, this ratio is preferably not less than 0.14. By this ratio being set to be not greater than 0.29, the influence of the side apex 22 on the weight and the rolling resistance is suppressed. From this standpoint, this ratio is preferably not greater than 0.24.

The thickness ts is adjusted as appropriate on the basis of the specifications of the tire 2 or the like, but is generally set in a range of not less than 8 mm and not greater than 13 mm.

In FIG. 2, a double-headed arrow h2 represents the distance in the radial direction from the bead base line to a radially outer end 50 of the side apex 22. The distance h2 is the height, in the radial direction, of the side apex 22.

In the tire 2, in the radial direction, the position of the outer end 50 of the side apex 22 coincides with the position of the outer end PA of the carcass 12, or the outer end 50 of the side apex 22 is located inward of the outer end PA of the carcass 12. In other words, the ratio of the distance h2 relative to the distance h1 represented in FIG. 1 is not greater than 1, specifically, not greater than 1.00. In the tire 2, the height h2, in the radial direction, of the side apex 22 is controlled such that the outer end 50 of the side apex 22 is not beyond the axially outer end PA of the carcass 12, namely, the position PA at which the carcass 12 has the maximum width. In the tire 2, the influence of the side apex 22 on the weight and the rolling resistance thereof is effectively suppressed. From this standpoint, in the tire 2, the outer end 50 of the side apex 22 is preferably located inward of the outer end PA of the carcass 12 in the radial direction. Specifically, the ratio of the distance h2 relative to the distance h1 is preferably not greater than 0.98, more preferably not greater than 0.95, and further preferably not greater than 0.93. In the tire 2, as described above, the side apex 22 is provided so as to intersect the normal line LT. Thus, a lower limit for this ratio is not set.

As described above, in the tire 2, the contour of the rim protector 42, which projects outward from the main body 44 of the side piece 40, is represented by the bob profile, which includes the first circular arc and the second circular arc. According to the rim protector 42, the thickness of the rim protector 42 from the position PW, at which the tire 2 has the maximum width, to the bead 10 portion is effectively ensured while the influence of the rim protector 42 on the weight is suppressed. The rim protector 42 contributes to enhancement of the lateral stiffness of the tire 2.

Furthermore, in the tire 2, the top PT of the rim protector 42 is located at an appropriate position. Thus, even when the tire 2 is mounted onto any of the applicable rims 46, the rim protector 42 sufficiently serves to prevent damage of the sidewall 6 or the flange 48.

In the tire 2, the side apex 22 is provided radially outward of each bead 10 so as to extend outward in the radial direction along the carcass 12. The side apex 22 intersects the normal line LT, which is normal to the carcass 12 and passes through the top PT of the rim protector 42, and has an appropriate thickness to at the position of the normal line LT. The side apex 22 contributes to enhancement of the in-plane torsional stiffness while suppressing the influence thereof on the weight.

According to the present invention, the pneumatic tire 2 that has the rim protector 42 capable of sufficiently performing its function and has enhanced stiffness while an increase in the weight of the tire 2 is suppressed, is obtained.

As described above, the bob profile, which represents the contour of the rim protector 42, includes the first circular arc and the second circular arc. The sizes of the first circular arc and the second circular arc influence the function of the rim protector 42 and the lateral stiffness of the tire 2, and the synergy with the side apex 22.

In the tire 2, the ratio of the radius R2 of the second circular arc relative to the radius R1 of the first circular arc is preferably not less than 0.056. By this ratio being set to be not less than 0.056, the thickness of the rim protector 42 is sufficiently ensured. The rim protector 42 serves to prevent damage of the sidewall 6 or the flange 48 and also contributes to enhancement of the stiffness. Since the second circular arc has an appropriate size, entrainment of air due to the contour represented by the second circular arc is suppressed, so that a molding failure is prevented. From this standpoint, this ratio is more preferably not less than 0.066.

In the tire 2, the ratio of the radius R2 of the second circular arc relative to the radius R1 of the first circular arc is preferably not greater than 0.117. By this ratio being set to be not greater than 0.117, the thickness of the rim protector 42 is appropriately maintained. In the tire 2, the influence of the rim protector 42 on the weight thereof is effectively suppressed. From this standpoint, this ratio is more preferably not greater than 0.100.

In the tire 2, the radius R1 of the first circular arc is preferably not less than 150 mm and preferably not greater than 450 mm. By the radius R1 being set to be not less than 150 mm, the thickness of the rim protector 42 is appropriately maintained. In the tire 2, the influence of the rim protector 42 on the weight thereof is effectively suppressed. By the radius R1 being set to be not greater than 450 mm, the thickness of the rim protector 42 is sufficiently ensured. The rim protector 42 serves to prevent damage of the sidewall 6 or the flange 48 and also contributes to enhancement of the stiffness. The contour represented by the first circular arc is close to a substantially flat shape. Thus, even when a plurality of tires 2 are piled up and stored, collapse of the tires 2 is less likely to occur.

In the tire 2, the radius R2 of the second circular arc is preferably not less than 15 mm and preferably not greater than 40 mm. By the radius R2 being set to be not less than 15 mm, the thickness of the rim protector 42 is sufficiently ensured. The rim protector 42 serves to prevent damage of the sidewall 6 or the flange 48 and also contributes to enhancement of the stiffness. Particularly, since the second circular arc has an appropriate size, entrainment of air due to the contour represented by the second circular arc is suppressed, so that a molding failure is prevented. By the radius R2 being set to be not greater than 40 mm, the thickness of the rim protector 42 is appropriately maintained. In the tire 2, the influence of the rim protector 42 on the weight thereof is effectively suppressed.

In the tire 2, the radius R1 of the first circular arc is larger than the radius Rs of the outer circular arc. Accordingly, the thickness of the rim protector 42 is sufficiently ensured. The rim protector 42 serves to prevent damage of the sidewall 6 or the flange 48 and also contributes to enhancement of the stiffness. From this standpoint, the ratio of the radius R1 relative to the radius Rs is preferably not less than 2 and more preferably not less than 3. From the standpoint that: the rim protector 42 having an appropriately maintained thickness is obtained; and the influence of the rim protector 42 on the weight is suppressed, the ratio of the radius R1 relative to the radius Rs is preferably not greater than 10 and more preferably not greater than 9.

In the tire 2, dramatic enhancement of the lateral stiffness and the in-plane torsional stiffness is achieved by the rim protector 42, which has the bob profile, and the side apex 22. Thus, in the tire 2, as shown in FIG. 1, the small main apex 28 can be used. The small main apex 28 contributes to further reduction of the weight and the rolling resistance.

In FIG. 2, reference character PF indicates the radially outer end of the rim 46. A double-headed arrow hf represents the distance in the radial direction from the bead base line to the outer end PF of the rim 46. A double-headed arrow h4 represents the distance in the radial direction from the bead base line to a radially outer end 52 of the main apex 28. The distance h4 is the height, in the radial direction, of the main apex 28. A double-headed arrow ha represents the distance in the radial direction from a radially outer end 54 of the core 26 to the radially outer end 52 of the main apex 28. The distance ha is the length, in the radial direction, of the main apex 28.

In the tire 2, in the radial direction, the outer end 52 of the main apex 28 is preferably located inward of the outer end PF of the rim 46. Accordingly, the weight and the rolling resistance of the tire 2 can be further reduced. From this standpoint, the ratio of the distance h4 relative to the distance hf is preferably not greater than 0.9. In light of stiffness of the bead 10, this ratio is preferably not less than 0.6.

In the tire 2, the length ha of the main apex 28 is preferably not less than 5 mm and preferably not greater than 20 mm. By the length ha being set to be not less than 5 mm, the main apex 28 effectively contributes to the stiffness of the bead 10. From this standpoint, the length ha is more preferably not less than 7 mm. By the length ha being set to be not greater than 20 mm, the influence of the main apex 28 on the weight and the rolling resistance is effectively suppressed. From this standpoint, the length ha is more preferably not greater than 15 mm.

As described above, in the tire 2, dramatic enhancement of the lateral stiffness and the in-plane torsional stiffness is achieved by the rim protector 42, which has the bob profile, and the side apex 22. Thus, in the tire 2, as shown in FIG. 1, the carcass 12 having the short turned-up portions 34 can be used. The short turned-up portions 34 contribute to further reduction of the weight and the rolling resistance. As shown in FIG. 1, the structure of the carcass 12 having the short turned-up portions 34 is referred to as low turn-up (LTU) structure.

In the tire 2, from the standpoint that the influence of each turned-up portion 34 on the weight and the rolling resistance is effectively suppressed, an end 56 of the turned-up portion 34 is preferably located inward of the axially outer end PA of the carcass 12 in the radial direction. The end 56 of the turned-up portion 34 is more preferably located inward of the top PT of the rim protector 42 in the radial direction. Furthermore, the end 56 of the turned-up portion 34 is more preferably located inward of the outer end PF of the rim 46 in the radial direction.

In FIG. 2, a double-headed arrow h5 represents the distance in the radial direction from the bead base line to the end 56 of the turned-up portion 34. The distance h5 is the height, in the radial direction, of the turned-up portion 34.

In the tire 2, from the standpoint that the influence of each turned-up portion 34 on the weight and the rolling resistance is effectively suppressed, the ratio of the distance h5 relative to the distance hf in the radial direction from the bead base line to the outer end PF of the rim 46 is preferably not greater than 0.9. From the standpoint that each turned-up portion 34 is assuredly prevented from being pulled out, this ratio is preferably not less than 0.5.

In FIG. 1, a solid line RBL is a rim base line. The rim base line is a line that defines the rim width (see JATMA) of the rim 46. The rim base line extends in the radial direction. A double-headed arrow W represents the distance in the axial direction from the rim base line to the top PT of the rim protector 42. The distance W is the projecting length of the rim protector 42.

In the tire 2, the projecting length W is preferably not less than 12 mm. By the projecting length W being set to be not less than 12 mm, the rim protector 42 effectively serves to prevent damage of the flange 48 or the sidewall 6. The top PT portion of the rim protector 42 effectively contributes to the stiffness of the bead 10 portion. Thus, in the tire 2, enhancement of the stiffness thereof can be achieved. Furthermore, movement of the bead 10 portion is effectively suppressed. Thus, in the tire 2, an increase in the rolling resistance thereof is suppressed.

In the tire 2, the projecting length W is preferably not greater than 18 mm. By the projecting length W being set to be not greater than 18 mm, the volume of the rim protector 42 is appropriately maintained. In the tire 2, the influence of the rim protector 42 on the weight thereof is suppressed. Furthermore, since the influence of the rim protector 42 on the stiffness is suppressed, favorable ride comfort is maintained with the tire 2.

EXAMPLES

Example 1

The tire shown in FIGS. 1 and 2 was produced. The size of the tire is 225/45R17. The specifications of Example 1 are as shown in Table 1 below. In the table, "Example" is abbreviated as "Ex.". In Example 1, the thickness ts of each side piece was set to 10.5 mm. The height h1 from the bead base line to the position at which the carcass has the maximum width was set to 45 mm. The height H, in the radial direction, of the carcass was 86 mm.

In Example 1, the center of the first circular arc is located inward the bob profile. This is represented by "in" in the "C1" row of Table 1. The center of the second circular arc is located outward of the bob profile. This is represented by "out" in the "C2" row of Table 1.

In Example 1, the complex elastic modulus E* of each side apex was 60 MPa. The complex elastic modulus E* of each main apex was 60 MPa, and the length ha, in the radial direction, of each main apex was 10 mm.

Comparative Example 1

A tire of Comparative Example 1 is a conventional tire. The specifications of Comparative Example 1 are as shown in Table 1 below. In the table, "Comparative Example" is abbreviated as "Comp. Ex.". In Comparative Example 1, a conventional configuration was used for the bob profile, and the height h1 from the bead base line to the position at which the carcass has the maximum width was set to 50 mm. The complex elastic modulus E* of each main apex was 60 MPa, and the length ha, in the radial direction, of each main apex was 30 mm.

Comparative Example 2

A tire of Comparative Example 2 is a conventional tire. The specifications of Comparative Example 2 are as shown in Table 1 below. The tire of Comparative Example 2 is formed by adding the side apexes in Example 1 to Comparative Example 1. In Comparative Example 2, due to the addition of the side apexes, the height ha of each main apex is changed from 30 mm to 10 mm.

Comparative Example 3

A tire of Comparative Example 3 is a conventional tire. The specifications of Comparative Example 3 are as shown in Table 1 below. The tire of Comparative Example 3 is formed by removing the side apexes from Example 1 and changing the height ha of each main apex from 15 mm to 30 mm.

Examples 2 and 3 and Comparative Examples 4 and 5

Tires of Examples 2 and 3 and Comparative Examples 4 and 5 were obtained in the same manner as in Example 1, except the distance h3 in the radial direction from the bead base line to the top PT of the rim protector was changed such that the ratio (h3/H) of the distance h3 relative to the height H, in the radial direction, of the carcass was as shown in Table 2 below.

Examples 4 to 7 and Comparative Examples 6 and 7

Tires of Examples 4 to 7 and Comparative Examples 6 and 7 were obtained in the same manner as in Example 1, except the thickness ta of each side apex was changed such that the ratio (ta/ts) of the thickness ta relative to the thickness ts of the side piece was as shown in Table 3 below.

Examples 8 to 11 and Comparative Examples 8 and 9

Tires of Examples 8 to 11 and Comparative Examples 8 and 9 were obtained in the same manner as in Example 1, except the height h2, in the radial direction, of each side apex was changed such that the ratio (h2/h1) of the height h2 relative to the height h1 was as shown in Table 4 below.

Examples 12 to 15

Tires of Examples 12 to 15 were obtained in the same manner as in Example 1, except the radius R1 of the first circular arc and the radius R2 of the second circular arc were changed such that the ratio (R2/R1) of the radius R2 relative to the radius R1 was as shown in Table 5 below.

[Weight]
The weight of each tire was measured. The results are shown in Tables 1 to 5 below as indexes with the value of Comparative Example 1 being defined as 100. The lower the value is, the better the result is, that is, the lower the weight is. Being not greater than 101.0 was set as a target.

[Functionality]
Each tire was mounted onto a rim, and the distance (hereinafter, referred to as projecting distance) from the end of a flange of the rim to the top of the rim protector was measured. A largest rim (size=8.5 J) and a smallest rim (size=7.0 J) were selected from among applicable rims, and the projecting distance was measured for each rim. When the largest rim was used, a load was not applied, and the projecting distance (hereinafter, referred to as maximum projecting distance) was measured. When the smallest rim was used, a load corresponding to twice the "LOAD CAPACITY" in the ETRTO standard was applied, and the projecting distance (hereinafter, referred to as minimum projecting distance) was measured. The average of the maximum projecting distance and the minimum projecting distance was calculated. The results are shown as indexes in Tables 1 to 5 below. The higher the value is, the better the result is. That is, a higher value represents that even with the smallest rim or the largest rim, the projecting distance of the rim protector is appropriately maintained so that the rim protector sufficiently performs its function. Being not less than 3.5 was set as a target.

[Lateral Stiffness]
Each tire was mounted onto a 7.5 J rim and inflated with air to an internal pressure of 230 kPa. A vertical load (1.5 kN) was applied, and the tire was brought into contact with the ground. Then, a repulsive force and an amount of movement of the central position of the tread when a lateral load (0.5 kN) was applied were measured, and a lateral stiffness was calculated. The results are shown as indexes in Tables 1 to 5 below. The higher the value is, the better the result is, that is, the higher the lateral stiffness is. Being not less than 4.0 was set as a target.

[In-Plane Torsional Stiffness]
In-plane torsional stiffness was measured under the following measurement conditions by using a sidewall stiffness tester.
Used rim: 7.5 J
Internal pressure: 230 kPa
The results are shown as indexes in Tables 1 to 5 below. The higher the value is, the higher the in-plane torsional stiffness is. Being not less than 3.5 was set as a target.

[Rolling Resistance Coefficient]
A rolling resistance coefficient (RRC) was measured under the following measurement conditions by using a rolling resistance tester.
Used rim: 7.5 J (made of an aluminum alloy)
Internal pressure: 250 kPa
Load: 5.26 kN
Speed: 80 km/h
The results are shown as indexes in Tables 1 to 5 below. The lower the value is, the better the result is, that is, the lower the rolling resistance coefficient is. Being not greater than 3.5 was set as a target.

TABLE 1

| | Results of Evaluation | | | |
|---|---|---|---|---|
| | Comp. Ex. 1 | Comp. Ex. 2 | Comp. Ex. 3 | Ex. 1 |
| C1 | out | out | in | in |
| R1 [mm] | 45 | 45 | 300 | 300 |

TABLE 1-continued

Results of Evaluation

|  | Comp. Ex. 1 | Comp. Ex. 2 | Comp. Ex. 3 | Ex. 1 |
|---|---|---|---|---|
| C2 | out | out | out | out |
| R2 [mm] | 8 | 8 | 25 | 25 |
| R2/R1 [—] | 0.178 | 0.178 | 0.083 | 0.083 |
| h3/H [—] | 0.35 | 0.35 | 0.35 | 0.35 |
| ta/ts [—] | — | 0.19 | — | 0.19 |
| h2/h1 [—] | — | 0.76 | — | 0.84 |
| Weight [—] | 100.5 | 100.0 | 100.5 | 101.0 |
| Functionality [—] | 3.0 | 3.0 | 4.0 | 4.5 |
| Lateral stiffness [—] | 2.5 | 3.0 | 3.0 | 4.5 |
| In-plane torsional stiffness [—] | 2.0 | 3.0 | 2.5 | 4.0 |
| RRC [—] | 2.8 | 3.0 | 3.0 | 3.0 |

TABLE 2

Results of Evaluation

|  | Comp. Ex. 4 | Ex. 2 | Ex. 3 | Comp. Ex. 5 |
|---|---|---|---|---|
| C1 | in | in | in | in |
| R1 [mm] | 300 | 300 | 300 | 300 |
| C2 | out | out | out | out |
| R2 [mm] | 25 | 25 | 25 | 25 |
| R2/R1 [—] | 0.083 | 0.083 | 0.083 | 0.083 |
| h3/H [—] | 0.23 | 0.29 | 0.41 | 0.47 |
| ta/ts [—] | 0.19 | 0.19 | 0.19 | 0.19 |
| h2/h1 [—] | 0.84 | 0.84 | 0.84 | 0.84 |
| Weight [—] | 101.5 | 101.0 | 100.5 | 100.5 |
| Functionality [—] | 3.5 | 4.0 | 3.5 | 3.0 |
| Lateral stiffness [—] | 4.0 | 4.0 | 4.0 | 3.5 |
| In-plane torsional stiffness [—] | 4.0 | 4.0 | 3.5 | 3.0 |
| RRC [—] | 3.5 | 3.0 | 3.0 | 3.0 |

TABLE 3

Results of Evaluation

|  | Comp. Ex. 6 | Ex. 4 | Ex. 5 | Ex. 6 | Ex. 7 | Comp. Ex. 7 |
|---|---|---|---|---|---|---|
| C1 | in | in | in | in | in | in |
| R1 [mm] | 300 | 300 | 300 | 300 | 300 | 300 |
| C2 | out | out | out | out | out | out |
| R2 [mm] | 25 | 25 | 25 | 25 | 25 | 25 |
| R2/R1 [—] | 0.083 | 0.083 | 0.083 | 0.083 | 0.083 | 0.083 |
| h3/H [—] | 0.35 | 0.35 | 0.35 | 0.35 | 0.35 | 0.35 |
| ta/ts [—] | 0.05 | 0.10 | 0.14 | 0.24 | 0.29 | 0.33 |
| h2/h1 [—] | 0.84 | 0.84 | 0.84 | 0.84 | 0.84 | 0.84 |
| Weight [—] | 100.5 | 100.5 | 101.0 | 101.0 | 101.0 | 101.5 |
| Functionality [—] | 4.0 | 4.0 | 4.5 | 4.5 | 4.5 | 4.5 |
| Lateral stiffness [—] | 3.5 | 4.0 | 4.5 | 4.5 | 4.5 | 4.5 |
| In-plane torsional stiffness [—] | 3.0 | 3.5 | 4.0 | 4.0 | 4.5 | 4.5 |
| RRC [—] | 3.0 | 3.0 | 3.0 | 3.0 | 3.5 | 4.0 |

TABLE 4

Results of Evaluation

|  | Comp. Ex. 8 | Ex. 8 | Ex. 9 | Ex. 10 | Ex. 11 | Comp. Ex. 9 |
|---|---|---|---|---|---|---|
| C1 | in | in | in | in | in | in |
| R1 [mm] | 300 | 300 | 300 | 300 | 300 | 300 |
| C2 | out | out | out | out | out | out |
| R2 [mm] | 25 | 25 | 25 | 25 | 25 | 25 |
| R2/R1 [—] | 0.083 | 0.083 | 0.083 | 0.083 | 0.083 | 0.083 |
| h3/H [—] | 0.35 | 0.35 | 0.35 | 0.35 | 0.35 | 0.35 |
| ta/ts [—] | — | 0.19 | 0.19 | 0.19 | 0.19 | 0.19 |
| h2/h1 [—] | 0.67 | 0.80 | 0.89 | 0.93 | 1.00 | 1.11 |
| Weight [—] | 101.0 | 101.0 | 101.0 | 101.0 | 101.0 | 101.5 |
| Functionality [—] | 4.5 | 4.5 | 4.5 | 4.5 | 4.5 | 4.5 |
| Lateral stiffness [—] | 3.5 | 4.0 | 4.5 | 4.5 | 4.5 | 4.5 |
| In-plane torsional stiffness [—] | 3.0 | 3.5 | 4.0 | 4.0 | 4.0 | 4.0 |
| RRC [—] | 3.0 | 3.0 | 3.0 | 3.0 | 3.5 | 4.0 |

TABLE 5

Results of Evaluation

|  | Ex. 12 | Ex. 13 | Ex. 14 | Ex. 15 |
|---|---|---|---|---|
| C1 | in | in | in | in |
| R1 [mm] | 450 | 380 | 300 | 300 |
| C2 | out | out | out | out |
| R2 [mm] | 25 | 25 | 30 | 35 |
| R2/R1 [—] | 0.056 | 0.066 | 0.100 | 0.117 |
| h3/H [—] | 0.35 | 0.35 | 0.35 | 0.35 |
| ta/ts [—] | 0.19 | 0.19 | 0.19 | 0.19 |
| h2/h1 [—] | 0.84 | 0.84 | 0.84 | 0.84 |
| Weight [—] | 100.5 | 101.0 | 101.0 | 101.0 |
| Functionality [—] | 4.0 | 4.5 | 4.5 | 4.5 |
| Lateral stiffness [—] | 4.0 | 4.5 | 4.5 | 4.5 |
| In-plane torsional stiffness [—] | 3.5 | 4.0 | 4.0 | 4.0 |
| RRC [—] | 3.0 | 3.0 | 3.0 | 3.5 |

As shown in Tables 1 to 5, the evaluation for the tires of the examples is higher than that for the tires of the comparative examples. From the results of evaluation, advantages of the present invention are clear.

The above-described technique regarding the rim protector and the side apex is also applicable to various types of tires.

The above descriptions are merely illustrative examples, and various modifications can be made without departing from the principles of the present invention.

What is claimed is:

1. A pneumatic tire comprising a tread, a pair of side pieces, a pair of beads, and a carcass, wherein
   each side piece extends from an edge of the tread substantially inward in a radial direction,
   each bead is located inward of the side piece in an axial direction at a radially inner portion of the side piece,
   the carcass extends along inner sides of the tread and the side pieces and on and between one of the beads and the other of the beads,
   the side piece includes a main body and a rim protector projecting outward from the main body and extending in a circumferential direction, a reference profile representing a contour of the main body is represented by a plurality of circular arcs aligned in the radial direction, the circular arcs include an outer circular arc extending substantially outward in the radial direction from a reference position corresponding to a position at which the tire has a maximum width in the axial direction, and an inner circular arc extending substantially inward in the radial direction from the reference position, and the outer circular arc and the inner circular arc are tangent to each other at the reference position, a bob profile representing a contour of the rim protector includes two circular arcs aligned in the radial direction, a point of intersection between the circular arcs is a top of the rim protector, and, of the circular arcs, one circular arc extending substantially outward in the radial direction from the top is a first circular arc, and the other circular arc extending substantially inward in the radial direction from the top is a second circular arc, the first circular arc is tangent to the outer circular arc at a radially outer end thereof, and a center of the first circular arc is located inward of the bob profile, the second circular arc is tangent to the inner circular arc at a radially inner end thereof, and a center of the second circular arc is located outward of the bob profile, a ratio of a distance in the radial direction from a bead base line of the tire to the top relative to a distance in the radial direction from the bead base line to a radially outer end of the carcass is not less than 0.29 and not greater than 0.41, the side piece includes a side apex, and the side apex extends outward in the radial direction along the carcass at a radially outer side of the bead, the side apex intersects a normal line that is normal to the carcass and passes through the top, a ratio of a thickness of the side apex measured along the normal line, relative to a thickness of the side piece measured along the normal line, is not less than 0.10 and not greater than 0.29, and in the radial direction, a position of an outer end of the side apex coincides with a position of an axially outer end of the carcass, or the outer end of the side apex is located inward of the axially outer end of the carcass.

2. The pneumatic tire according to claim 1, wherein the outer end of the side apex is located inward of the axially outer end of the carcass in the radial direction.

3. The pneumatic tire according to claim 1, wherein a ratio of a radius of the second circular arc relative to a radius of the first circular arc is not less than 0.056 and not greater than 0.117.

4. The pneumatic tire according to claim 2, wherein a ratio of a radius of the second circular arc relative to a radius of the first circular arc is not less than 0.056 and not greater than 0.117.

* * * * *